UNITED STATES PATENT OFFICE.

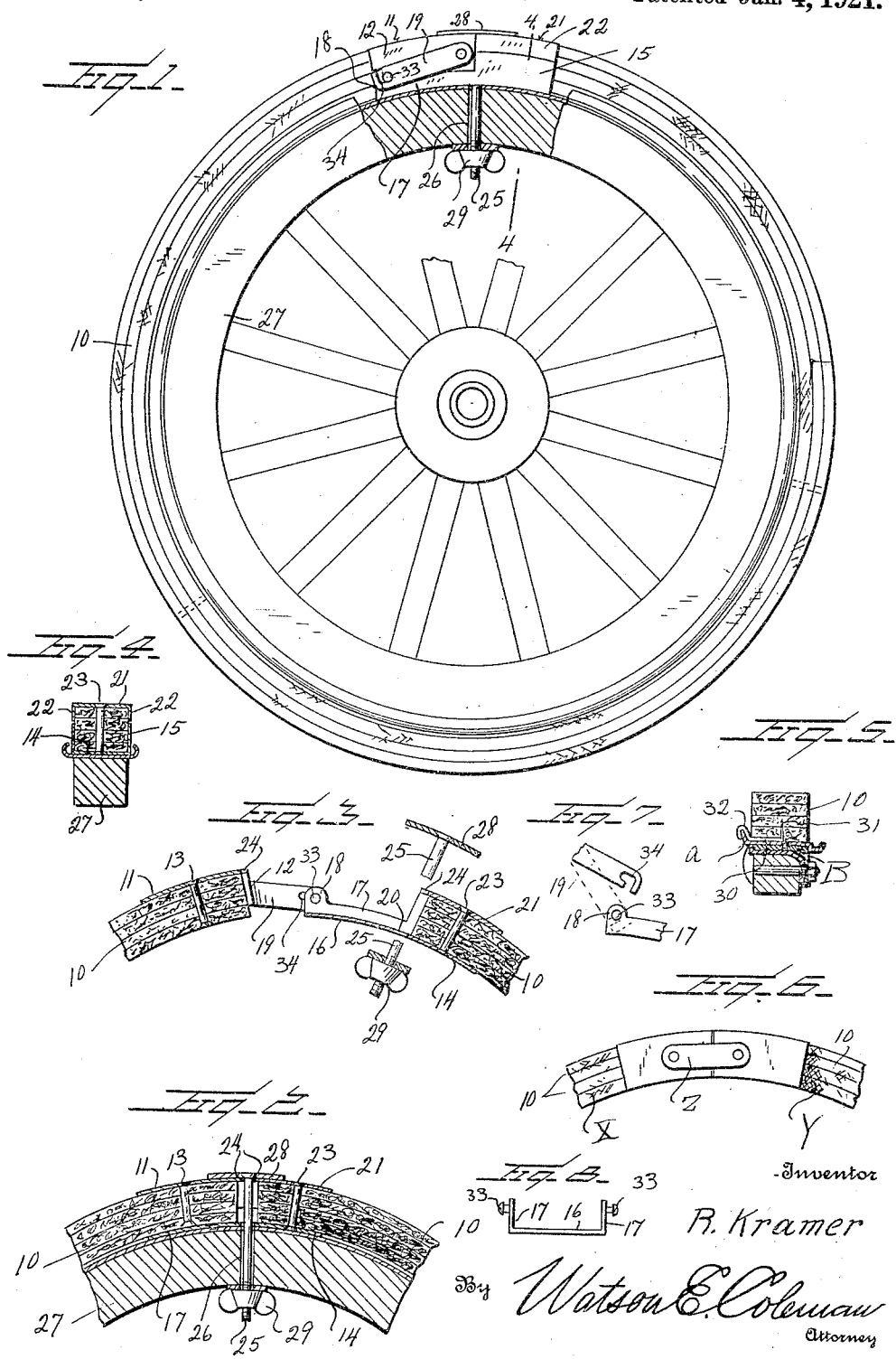

RUDOLPH KRAMER, OF SHEYENNE, NORTH DAKOTA.

EMERGENCY-TIRE FOR AUTOMOBILE-WHEELS.

1,364,200.   Specification of Letters Patent.   Patented Jan. 4, 1921.

Application filed February 13, 1920. Serial No. 358,436.

*To all whom it may concern:*

Be it known that I, RUDOLPH KRAMER, a citizen of the United States, residing at Sheyenne, in the county of Eddy and State of North Dakota, have invented certain new and useful Improvements in Emergency-Tires for Automobile-Wheels, of which the following is a specification, reference being had to the accompanying drawings.
This invention relates to automobile wheels, and particularly to what might be termed emergency tires to be used in case of a puncture or other accident happening to the pneumatic tire, the general object of my invention being to provide an emergency rim or tire which can be applied to the rim of the wheel in place of the tire in case of trouble, which can be put on easily and by means of which the car can be run to the nearest place for repair, the emergency rim or tire fully protecting the wheel from damage and doing away with the necessity of the car being run upon the deflated tire or being run upon its rim, with injury to the rim.

A further object is to provide a device of this character in which the emergency rim or tire is composed of a plurality of layers of relatively heavy fabric impregnated with water-proof material which will make the fabric relatively stiff and firm.

And a further object is to provide a device of this character in which the two ends of the strip of fabric are connected by means of a locking device.

A further object is to provide an improved locking device for this purpose which will permit the ready replacement of the emergency tire over the wheel rim and then permit the emergency tire to be contracted upon the wheel rim, the locking device, when the emergency tire is fully contracted, holding the ends of the emergency tire from coming apart.
A further object is to provide a locking device of this character which is held to the tire, and particularly held in place by the bolt or other locking device passing through the emergency tire locking device and through the inflating valve opening in the wheel rim.

A further object is to provide an emergency tire of the construction described which is adapted to be used with a clencher rim or with a demountable rim.

Other objects will appear in the course of the following description.

My invention is illustrated in the accompanying drawings, wherein:—

Figure 1 is a side elevation of my emergency tire as applied to an automobile wheel;

Fig. 2 is a longitudinal sectional view through a portion of the wheel and the tire showing the manner in which the emergency tire is clamped on the wheel;

Fig. 3 is a longitudinal sectional view of a portion of a tire showing the joint at the ends of the tire;

Fig. 4 is a section on the line 4—4 of Fig. 1;

Fig. 5 is a cross sectional view through the tire and a portion of the wheel showing the manner in which the tire is engaged with a demountable rim;

Fig. 6 is a fragmentary side elevation of an emergency tire formed of a plurality of sections and showing the manner in which the sections are connected to each other;

Fig. 7 is a fragmentary side elevation of the link 19 and member 17 detached from each other;

Fig. 8 is an end view of the member 17.

Referring to these drawings, it will be seen that my emergency rim comprises a series of strips or layers of relatively heavy fabric, these strips being designated 10, and four of these strips being shown. These strips are arranged in superposed relation and may be held together, if desired, at a plurality of points in any suitable manner, as by rivets, or the ends of the strips may be riveted together, as will be later described in connection with the locking device, these strips having a width approximately equal to the normal width of a wheel rim between the flanges thereof, or they may have a narrower width than this, and the tire may be composed of any number of these strips sufficient to give the tire sufficient depth.

For the purpose of connecting the ends of the strips of fabric 10, I attach to one end of the emergency tire composed of these strips of fabric, an approximately U-shaped plate or casing, designated 11. This is made of sheet metal and has the inwardly extending side flanges 12 and is held in place upon the ends of the strips forming the tire by means of one or more rivets 13 or other suitable fastening devices. The opposite end of the tire has attached to its inner face a plate 14 formed at one end with outwardly extending side flanges 15 which embrace or partially embrace the strips 10, this plate being extended beyond these side flanges, as at 16, and provided with relatively outwardly extending flanges 17, these flanges at their extremities being formed to provide ears 18. Pivotally engaging these ears are links 19 which are pivotally engaged with the side flanges 12 of the member 11. This plate 14 at the junction of the flanges 15 with the flanges 17 is provided with an aperture 20. Disposed over the outside face of this end of the tire is a plate 21 having inwardly extending, lateral flanges 22, and this plate and the plate 14 are held in place upon the tire by means of a rivet 23 or other attaching device. The plate 11 and the plate 21 are formed at their ends with semi-circular notches 24 which, when these plates are brought together, form an aperture for the passage of an attaching bolt 25 which is designed to pass through the valve aperture 26 of a wheel felly 27, this bolt at its head end carrying a plate or washer 28 and at its opposite end carrying a washer and a nut 29.

In order that the device may be used with a demountable rim as in Fig. 5, I may attach at a plurality of points to this emergency tire and on the inner face thereof the clips 30. Each of these clips is formed by a small, relatively narrow strip of metal, angularly bent and pointed, as at 31, to be driven through one or more layers of the fabric forming the emergency tire or to be overturned upon these layers or otherwise attached thereto, each strip 30 at its outer end being angularly bent and then again upwardly extended to form a hook 32. This hook, as illustrated in Fig. 5, is designed to be engaged with the flange $a$ of a demountable rim B. Of course, the locking device previously described is intended to be used also.

When this device is to be applied to a clencher rim, the punctured pneumatic tire is removed from the rim and the emergency tire expanded, placed upon the rim, and then the two ends of the emergency tire are brought together until the links 19 assume the position shown in Fig. 1. The positioning of these links very nearly parallel to the plate 14 tends to resist longitudinal strain, that is longitudinal strain is applied to the links in the direction of their length to a very large extent, and inasmuch as the tire is then contracted upon a wheel rim, it is obvious that the longitudinal strain exerted cannot act to force the links into a greater angular relation to the plate 14. However, in order to firmly lock the emergency tire upon the wheel rim and prevent any creeping of the tire with relation to the rim, the bolt 25 is passed through the apertures 24 and 20 and through the aperture in the wheel felly through which the stem of the inflating valve is ordinarily passed, and then the nut 29 applied thereto, thus locking the device firmly in position between the two flanges of the clencher rim.

In applying this device to demountable rims which have only one flange on one side, the hooks 32 are engaged with this flange $a$ and thus prevent any lateral movement of the emergency tire with relation to the rim.

In order to permit the emergency rim or tire to be rolled up in a coil so as to make it handy to carry in a car, I preferably form the lugs 18 with outwardly projecting, headed studs 33, and form the links 19 with angular slots 34 to hook over these studs. When the emergency tire is contracted upon a rim, of course the studs will be drawn into the angular portions of the slots 34 (Fig. 7) so as to prevent any possibility of detachment of the two ends of the emergency tire from the wheel.

I do not wish to be limited to the details of construction illustrated, as these details might be varied in many ways without departing from the spirit of my invention, though it is to be understood that the embodiment shown has been found particularly effective in practice. I do not wish to be limited to the particular locking device illustrated, nor do I wish to be limited to an emergency tire which is split, as the emergency tire broadly considered might be a complete circle. Obviously, the emergency tire might be formed in sections, as indicated in Fig. 6, where the sections X and Y, constructed in entire accordance with the description heretofore given, are connected by means of links or shackles Z. Neither do I wish to be limited to any particular material for the emergency tire, nor to making it in a plurality of layers or strips.

I claim:—

1. An emergency tire of the character described comprising a plurality of layers of fabric, plates embracing the extremities of said layers, a pair of pivoted links connecting a plate on one end of said fabric layers with a plate on the opposite end, said links being adapted to be turned into such position as to draw the two ends of the emergency tire into contiguity with each other, the links under these circumstances being approximately parallel to the plates, the plates being apertured for the passage of a fastening device.

2. An emergency tire of the character described comprising a plurality of layers of fabric, plates embracing the extremities of said layers, a pair of pivoted links connecting a plate on one end of said fabric layers with a plate on the opposite end, said links being adapted to be turned into such position as to draw the two ends of the emergency tire into contiguity with each other, the links under these circumstances being approximately parallel to the plates, and a bolt adapted to pass through said plates and through the valve aperture in the wheel rim.

3. An emergency tire of the character described comprising a plurality of layers of fabric, plates embracing the extremities of said layers, a pair of pivoted links connecting a plate on one end of said plurality of layers with a plate on the opposite end, said links being adapted to be turned into such position as to draw the two ends of the emergency tire into contiguity with each other, the links under these circumstances being approximately parallel to the plates, a bolt adapted to pass through said emergency tire and through the valve aperture in the wheel rim, and rim flange engaging hooks mounted upon said emergency tire.

4. An emergency tire of the character described consisting of a plurality of strips of heavy fabric, plates attached to the ends of said strips and connecting the like ends of the strips to each other, one of said plates at one end of the plurality of strips being longitudinally extended and formed with ears, and links pivoted to said ears and to the plate on the opposite end of said plurality of strips whereby the ends of the strips may be brought into close contiguity with each other and the links forced into an approximately parallel relation to the plates, said plates being apertured, and a bolt adapted to pass through said apertures and through the valve aperture of a wheel rim.

5. An emergency tire of the character described consisting of a plurality of strips of heavy fabric, plates attached to the ends of said strips and connecting the like ends of the strips to each other, one of said plates at one end of the plurality of strips being longitudinally extended and formed with ears, and links pivoted to said ears and to the plate on the opposite end of said plurality of strips whereby the ends of the strips may be brought into close contiguity with each other and the links forced into an approximately parallel relation to the plates, said plates being apertured, and a bolt adapted to pass through said apertures and through the valve aperture of a wheel rim, and hook-shaped strips attached to the inner face of the emergency tire and extending laterally beyond the same and adapted to engage with the flange of a demountable rim.

6. An emergency tire of the character described comprising a flexible body, plates embracing the extremities of said body, a pair of links pivotally connected to one of said plates and provided with angular slots at their free ends, the opposite plate having side walls provided with laterally projecting, headed studs to engage in said slots, the links being adapted to be turned into such position as to draw the two ends of the emergency tire into contiguity with each other, the links under these circumstances being approximately parallel to the plates, and manually detachable means for preventing any rotative movement of the links when the emergency tire is contracted on a rim.

7. An emergency tire of the character described formed of a strip of flexible material, plates embracing the extremities of said strip of material, a pair of pivoted links connecting a plate on one end of said strip with a plate on the opposite end, said links being adapted to be turned into such position as to draw the two ends of the tire into contiguity with each other, and manually detachable means for preventing the reverse rotation of the links and the expansion of the emergency tire.

In testimony whereof I hereunto affix my signature.

RUDOLPH KRAMER.